(12) United States Patent
Chen et al.

(10) Patent No.: US 12,341,886 B2
(45) Date of Patent: Jun. 24, 2025

(54) DATA ENCRYPTION AND DECRYPTION METHOD, DEVICE, STORAGE MEDIUM AND ENCRYPTED FILE

(71) Applicant: CHINA UNIONPAY CO., LTD., Shanghai (CN)

(72) Inventors: Lin Chen, Shanghai (CN); Bin Xu, Shanghai (CN); Sen Yang, Shanghai (CN)

(73) Assignee: CHINA UNIONPAY CO., LTD., Shanghai (CN)

( * ) Notice: Subject to any disclaimer, the term of this patent is extended or adjusted under 35 U.S.C. 154(b) by 438 days.

(21) Appl. No.: 17/622,610

(22) PCT Filed: Sep. 28, 2020

(86) PCT No.: PCT/CN2020/118318
§ 371 (c)(1),
(2) Date: Dec. 23, 2021

(87) PCT Pub. No.: WO2021/103802
PCT Pub. Date: Jun. 3, 2021

(65) Prior Publication Data
US 2022/0360441 A1    Nov. 10, 2022

(30) Foreign Application Priority Data
Nov. 26, 2019  (CN) .......................... 201911176393.0

(51) Int. Cl.
*H04L 9/14*    (2006.01)
*G06F 21/60*   (2013.01)
(Continued)

(52) U.S. Cl.
CPC .............. *H04L 9/14* (2013.01); *G06F 21/602* (2013.01); *H04L 9/0618* (2013.01);
(Continued)

(58) Field of Classification Search
CPC ..... H04L 9/14; H04L 9/30–34; H04L 9/0822; H04L 9/0825; H04L 9/0618; H04L 63/04–0492; G06F 21/602
See application file for complete search history.

(56) References Cited

U.S. PATENT DOCUMENTS

| | | | | |
|---|---|---|---|---|
| 5,689,565 A | * | 11/1997 | Spies .................... | G06F 21/602 713/176 |
| 6,233,565 B1 | * | 5/2001 | Lewis ................. | H04L 63/0442 705/40 |

(Continued)

FOREIGN PATENT DOCUMENTS

| | | |
|---|---|---|
| EP | 1378092 | 6/2008 |
| KR | 20040092031 A  * | 11/2004 |
| TW | 201500955 | 1/2015 |

OTHER PUBLICATIONS

European Patent Office Action dated Jun. 30, 2022 issued for European Patent Application No. 20892055.3.

(Continued)

*Primary Examiner* — Madhuri R Herzog
(74) *Attorney, Agent, or Firm* — K&L Gates LLP (57) ABSTRACT

The application provides a data encryption and decryption method, device, storage medium, and encrypted file, and relates to the technical field of data processing. The method for data encryption includes: obtaining a first key, and performing an obfuscation operation on the first key and data to be encrypted to obtain obfuscation operation result data; obtaining a second key, and obtaining a first signature of the obfuscation operation result data according to the second key; obtaining a third key, and encrypting the first key, the data to be encrypted and the first signature using the third key to obtain a target ciphertext; obtaining a fourth key, and obtaining a second signature of the target ciphertext according to the fourth key; generating an encrypted file (Continued)

including the target ciphertext and the second signature. With the technical solutions of the application, security of data protection can be improved.

17 Claims, 7 Drawing Sheets

(51) Int. Cl.
    *H04L 9/06*           (2006.01)
    *H04L 9/08*           (2006.01)
    *H04L 9/32*           (2006.01)

(52) U.S. Cl.
    CPC .......... *H04L 9/0822* (2013.01); *H04L 9/0825* (2013.01); *H04L 9/3247* (2013.01)

(56) References Cited

U.S. PATENT DOCUMENTS

| | | | |
|---|---|---|---|
| 2002/0062438 A1 | 5/2002 | Asay et al. | |
| 2002/0133707 A1* | 9/2002 | Newcombe | H04L 69/329 713/189 |
| 2003/0012374 A1 | 1/2003 | Wu et al. | |
| 2005/0251865 A1* | 11/2005 | Mont | G06F 21/6245 726/26 |
| 2007/0271469 A1 | 11/2007 | Kim et al. | |
| 2008/0120504 A1* | 5/2008 | Kirkup | H04L 9/003 713/176 |
| 2014/0372748 A1 | 12/2014 | Dixon et al. | |
| 2015/0033016 A1* | 1/2015 | Thornton | H04L 9/0869 713/171 |
| 2016/0373418 A1* | 12/2016 | Ståhl | G06F 21/44 |

OTHER PUBLICATIONS

Office Action dated Mar. 21, 2022 issued for Taiwanese Patent Application No. 109126454.

Gupta, et al., "Role of Multiple Encryption in Secure Electronic Transaction", International Journal of Network Security & Its Applications (IJNSA), vol. 3, No. 6, Nov. 2011.

First Office Action issued on Feb. 9, 2021 for Chinese patent application No. 201911176393.0, the first Office Action issued on the Notice of Grant issued on Jun. 30, 2021.

Notice of Grant issued on Jun. 30, 2021 for Chinese patent application No. 201911176393.0.

First Office Action issued on Apr. 30, 2021 for Office Action for Taiwanese patent application No. 109126454.

International Search Report and Written Opinion issued on Jan. 4, 2021 for International PCT application No. PCT/CN2020/118318.

Chen et al., "Secure Obfuscation for Encrypted Ring Signatures", Acta Scientiarum Naturalium Universitatis Sunyatseni, vol. 53, No. 1, Jan. 2014.

vol. 2007, No. 3 of China's Excellent Master's Thesis Full-text Database Information Science and Technology Series, dated Sep. 15, 2007.

\* cited by examiner

| 1 | # publicly available data |
|---|---|
| 2 | |
| 3 | target ciphertext |
| 4 | |
| 5 | second signature |
| 6 | |

Fig. 3

| 1 | # publicly available data |
|---|---|
| 2 | |
| 3 | first key |
| 4 | |
| 5 | sensitive data 1 |
| 6 | sensitive data 2 |
| 7 | sensitive data 3 |
| 8 | |
| 9 | first signature |
| 10 | |
| 11 | second signature |
| 12 | |

Fig. 11

DATA ENCRYPTION AND DECRYPTION METHOD, DEVICE, STORAGE MEDIUM AND ENCRYPTED FILE

CROSS-REFERENCE TO RELATED APPLICATION

This application is a National Stage of International Application No. PCT/CN2020/118318, filed on Sep. 28, 2020, which claims priority of Chinese patent application No. 201911176393.0 entitled "Data encryption and decryption method, device, storage medium and encrypted file" filed on Nov. 26, 2019, both of which are incorporated herein by reference in their entirety for all purposes.

TECHNICAL FIELD

This application relates to the field of data processing technology, and in particular relates to a data encryption and decryption method, device and encrypted file.

BACKGROUND

With the development of network technology, transmission of information is facilitated using the network to transmit data. During data transmission, data may be leaked or tampered with. There is sensitive data in the transmitted data, and the sensitive data is not expected to be leaked or tampered with. Therefore, the transmission of data including sensitive data requires high transmission security.

At the present stage, an encryption device may encrypt data, that is, plaintext, and transmit the encrypted data, that is, ciphertext, to a decryption device, and the decryption device may decrypt the ciphertext to obtain the plaintext. However, the ciphertext may be tampered with during the transmission of the ciphertext, and the security of data protection is still low.

SUMMARY

Embodiments of the application provide a data encryption and decryption method, device, storage medium and encrypted file and can improve safety of data protection.

In a first aspect, the embodiments of the application provide a method for data encryption applied in an encryption device, the method comprising: obtaining a first key, and performing an obfuscation operation on the first key and data to be encrypted to obtain obfuscation operation result data; obtaining a second key, and obtaining a first signature of the obfuscation operation result data according to the second key; obtaining a third key, and encrypting the first key, the data to be encrypted and the first signature using the third key to obtain a target ciphertext; obtaining a fourth key, and obtaining a second signature of the target ciphertext according to the fourth key; generating an encrypted file including the target ciphertext and the second signature.

In a second aspect, the embodiments of the application provide a method for data decryption applied in a decryption device, the method comprising: receiving an encrypted file including a target ciphertext and a second signature, wherein the second signature is a signature of the target ciphertext and obtained by an encryption device according to a fourth key; decrypting the target ciphertext using a pre-stored fifth key paired with a third key to obtain a first key, data to be encrypted and a first signature; verifying the target ciphertext and the second signature using a sixth key paired with the fourth key; performing an obfuscation operation the same as in the encryption device on the first key and the data to be encrypted obtained via decrypting to obtain obfuscation operation result data, and verifying the obtained obfuscation operation result data and first signature using a seventh key paired with a second key, wherein the first signature is a signature of the obfuscation operation result data and obtained by the encryption device according to the second key.

In a third aspect, the embodiments of the application provide a n encryption device, comprising: an obfuscation operation module, configured to obtain a first key and perform an obfuscation operation on the first key and data to be encrypted to obtain an obfuscation operation result; a signature module, configured to obtain a second key and obtain a first signature of the obfuscation operation result according to the second key; an encryption module, configured to obtain a third key and encrypt the first key, the data to be encrypted and the first signature using the third key to obtain a target ciphertext, wherein the signature module is further configured to obtain a fourth key and obtain a second signature of the target ciphertext according to the fourth key; an encrypted file generation module, configured to generate an encrypted file including the target ciphertext and the second signature.

In a fourth aspect, the embodiments of the application provide a decryption device, comprising: a receiving module, configured to receive an encrypted file including a target ciphertext and a second signature, wherein the second signature is a signature of the target ciphertext and obtained by an encryption device according to a fourth key; a decryption module, configured to decrypt the target ciphertext using a pre-stored fifth key paired with a third key to obtain a first key, data to be encrypted and a first signature; a first verification module, configured to verify the target ciphertext and the second signature using a sixth key paired with the fourth key; a second verification module, configured to perform an obfuscation operation the same as in the encryption device on the first key and the data to be encrypted obtained via decrypting to obtain obfuscation operation result data, and verify the obfuscation operation result data and the first signature using a seventh key paired with a second key, wherein the first signature is a signature of the obfuscation operation result data and obtained by the encryption device according to the second key.

In a fifth aspect, the embodiments of the application provide an encryption device, comprising a processor, a memory, and a computer program stored on the memory and executable on the processor, wherein the computer program, when executed by the processor, implements the method for data encryption of the technical solutions in the first aspect.

In a sixth aspect, the embodiments of the application provide a decryption device, comprising a processor, a memory, and a computer program stored on the memory and executable on the processor, wherein the computer program, when executed by the processor, implements the method for data decryption of the technical solutions in the second aspect.

In a seventh aspect, the embodiments of the application provide a computer-readable storage medium storing a computer program thereon, wherein the computer program, when executed by a processor, implements the method for data encryption of the technical solutions in the first aspect or the method for data decryption of the technical solutions in the second aspect.

In an eighth aspect, the embodiments of the application provide an encrypted file, comprising: a target ciphertext, wherein the target ciphertext is obtained by encrypting a first key, data to be encrypted and a first signature using a third key, the first signature is a signature of obfuscation operation result data and obtained according to a second key, the obfuscation operation result data is data obtained by performing an obfuscation operation on the first key and the data to be encrypted; a second signature, wherein the second signature is a signature of the target ciphertext and obtained according to the fourth key.

BRIEF DESCRIPTION OF THE DRAWINGS

The present application can be better understood from the following description of specific embodiments of the present application in conjunction with the accompanying drawings, where the same or similar reference signs indicate the same or similar features.

DETAILED DESCRIPTION

Features and exemplary embodiments of various aspects of the present application will be described in detail below. In the following detailed description, many specific details are proposed in order to provide a comprehensive understanding of this application. However, it is obvious to those skilled in the art that this application can be implemented without some of these specific details. The following description of the embodiments is only to provide a better understanding of the present application by showing examples of the present application. This application is by no means limited to any specific configurations and algorithms proposed below, but covers any modification, replacement and improvement of elements, components and algorithms without departing from the spirit of this application. In the drawings and the following description, well-known structures and technologies are not shown in order to avoid unnecessary obscurity of the application.

Figure 1:
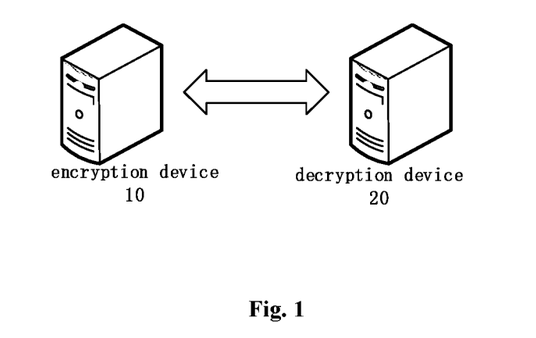
FIG. 1 is a schematic diagram of an application scenario of a data encryption and decryption method provided by an embodiment of the application.

This application provides a data encryption and decryption method, device, and encrypted file, which can be applied to scenarios where data is encrypted for safe transmission. FIG. 1 is a schematic diagram of an application scenario of a data encryption and decryption method provided by an embodiment of the application. As shown in FIG. 1, the data encryption and decryption method may be applied to an encryption device 10 and a decryption device 20. Among them, the encryption device 10 is used to implement the data encryption method in the embodiments of the present application. The decryption device 20 is used to implement the data decryption method in the embodiments of the present application.

In this application, the encryption device may perform a four-layer protection processing of obfuscation, signature, encryption, and re-signature on data to be encrypted, i.e., a plaintext, so that the data is difficult to be tampered with during transmission of the data, or if the data is tampered with, the decryption device may find timely and accurately the tampering of the data during decryption i.e., verification. In this way, the security of the data is improved.

Figure 2:
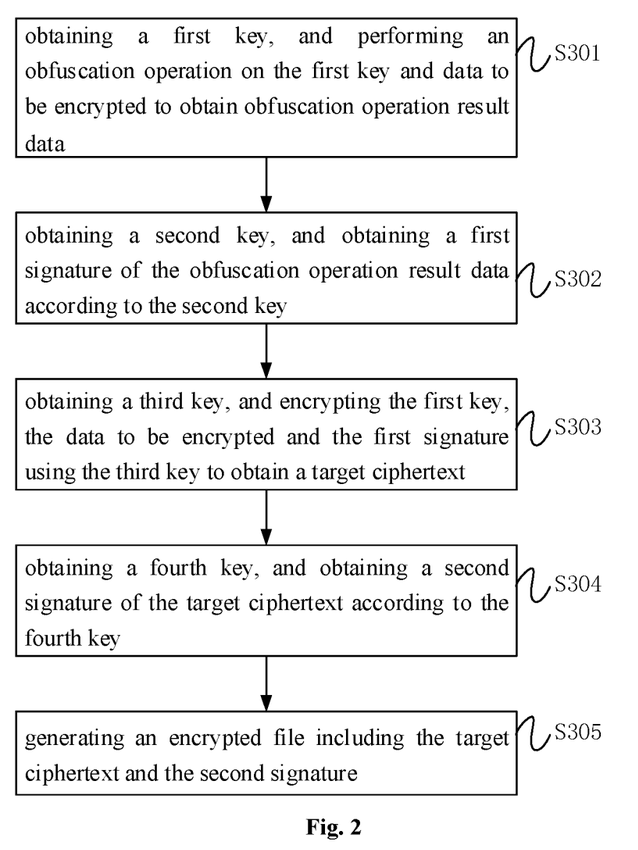
FIG. 2 is a flowchart of an embodiment of a data encryption method provided in the first aspect of the application.

FIG. 2 is a flowchart of an embodiment of a data encryption method provided in the first aspect of the application. The data encryption method may be applied to an encryption device. As shown in FIG. 2, the data encryption method may include steps S301 to S305.

In step S301, a first key is obtained, and an obfuscation operation is performed on the first key and the data to be encrypted to obtain obfuscation operation result data.

The data to be encrypted may be data that does not want to be leaked or tampered with. For example, the data to be encrypted may be sensitive data. Type, quantity, and size of the data to be encrypted are not limited here.

The obfuscation operation result data is result data of the obfuscation operation between the first key and the data to be encrypted. An obfuscation algorithm involved in the obfuscation operation may be pre-determined by the encryption device and the decryption device. The obfuscation algorithm may be a non-public obfuscation algorithm, that is, the obfuscation algorithm is only known by the encryption device and the decryption device, but not publicly disclosed. In some examples, each obfuscation operation may correspond to a random obfuscation factor. The obfuscation factor may affect a local variable in the obfuscation algorithm, so that each obfuscation operation will be different. An attacker cannot accurately obtain the obfuscation algorithm of each obfuscation operation, thus it is difficult to obtain the data to be encrypted or tamper with the data to be encrypted. Therefore, the security of data protection is further improved. In other examples, the obfuscation factor in the obfuscation operation may include the first key, that is, the first key may be used as the obfuscation factor to participate in the obfuscation operation, which is not limited here.

In some examples, the first key may be a public key.

In step S302, a second key is obtained, and a first signature of the obfuscation operation result data is obtained according to the second key.

According to the second key, the obfuscation operation result data is signed to obtain the first signature. In some examples, the first key is a public key, and the second key may be a private key corresponding to the first key, that is, the first key and the second key are a pair of public and private keys.

In step S303, a third key is obtained, and the first key, the data to be encrypted, and the first signature are encrypted using the third key to obtain a target ciphertext.

An encryption is performed here. The entirety of the first key, the data to be encrypted, and the first signature is encrypted using the third key. The encrypted first key, data to be encrypted and first signature is the target ciphertext. The third key may be a public key or a symmetric key, which is not limited here.

In step S304, a fourth key is obtained, and a second signature of the target ciphertext is obtained according to the fourth key.

The second signature is a signature for the target ciphertext. In some examples, the first key is a public key, and the fourth key may be a private key corresponding to the first key, that is, the first key and the fourth key are a pair of public and private keys. Further, the second key and the fourth key may be the same key.

In step S305, an encrypted file including the target ciphertext and the second signature is generated.

The encrypted file is generated using the target ciphertext and the second signature. The encrypted file includes the target ciphertext and the second signature. It should be noted that the encrypted file may also include publicly available data that is not obfuscated, signed, or encrypted, which is not limited here.

Figure 3:
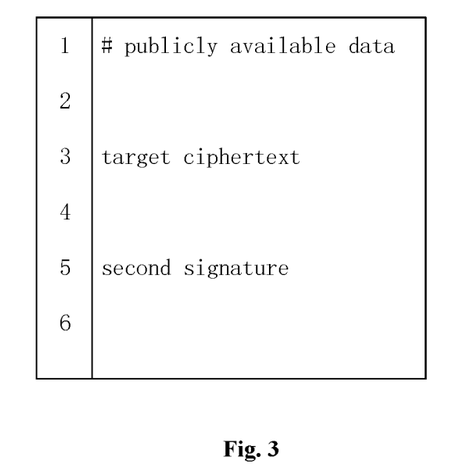
FIG. 3 is a schematic structural diagram of an example of a user-visible encrypted file provided by an embodiment of the application.
Figure 4:
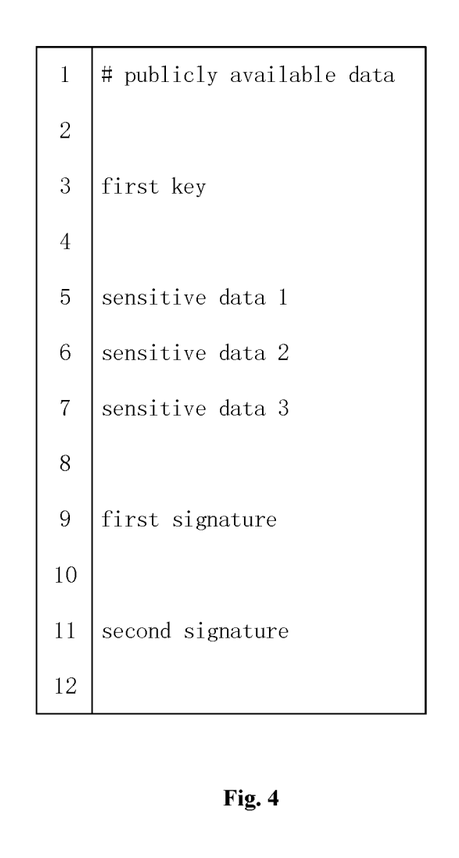
FIG. 4 is a schematic diagram of a plaintext structure corresponding to the encrypted file structure shown in FIG. 3 provided by an embodiment of the application.

For example, FIG. 3 is a schematic structural diagram of an example of a user-visible encrypted file provided by an embodiment of the application. As shown in FIG. 3, after the encrypted file is opened, the user can see the data that can be disclosed, such as the content description information that can be disclosed, the target ciphertext, and the second signature, without any decryption processing. FIG. 4 is a schematic diagram of a plaintext structure corresponding to the encrypted file structure shown in FIG. 3 provided by an embodiment of the application. As shown in FIG. 4, assuming that the data to be encrypted includes sensitive data 1, sensitive data 2, and sensitive data 3, the plaintext structure corresponding to the encrypted file structure specifically includes the data that can be disclosed, such as the content description information that can be disclosed, the first key, the sensitive data 1, the sensitive data 2, the sensitive data 3, the first signature and the second signature.

Figure 5:
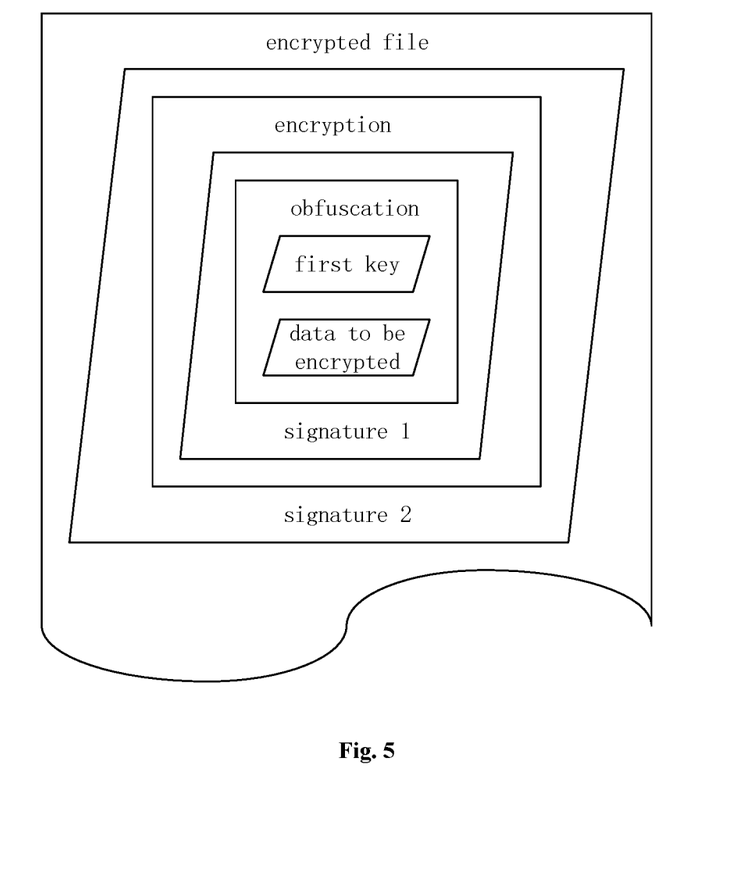
FIG. 5 is a schematic diagram of an example of generation form of an encrypted file provided by an embodiment of the application.

To describe more intuitively the four-layer protection processing of obfuscation, signature, encryption, and re-signature in the above embodiments, FIG. 5 is a schematic diagram of an example of generation form of an encrypted file provided by an embodiment of the application. As shown in FIG. 5, the obfuscation operation is performed on the first key and the data to be encrypted; the obfuscated first key and data to be encrypted are signed to obtain signature 1; the first key, the data to be encrypted, and the signature 1 are encrypted; the encrypted first key, the data to be encrypted, and the signature 1 are signed to obtain signature 2; and finally the encrypted file is obtained.

In the embodiments of the present application, the obfuscation operation is performed on the first key and the data to be encrypted, and the obfuscated first key and data to be encrypted are signed to obtain the first signature. The first key, the data to be encrypted, and the obtained first signature are encrypted using the third key, and the encrypted first key, data to be encrypted and first signature are signed to obtain the second signature, so as to obtain the encrypted file including the second signature, the encrypted first key, data to be encrypted and first signature. The data to be encrypted is processed by means of four protections: obfuscation, signature, encryption and re-signature. Thus, the security of data protection is improved.

For example, if the target ciphertext is replaced, in the subsequent decryption process, decryption failure or obtaining incorrect data will occur. In the case of decryption failure or obtaining incorrect data, the verification of the second signature will not succeed. Similarly, if the second signature is replaced, the verification of the second signature will not succeed. If leakage of key during transmission of the encrypted file causes the data to be encrypted is tampered with, in the subsequent decryption process, the verification of the tampered data to be encrypted and the first signature will not succeed, as the first signature is obtained by signing the obfuscated first key and data to be encrypted, and the obfuscation algorithm is not publicly disclosed. In this way, the security of the data is improved.

In some examples, the above data encryption method may further include receiving a third key generated and sent by the decryption device. That is, the third key is generated by the decryption device. The first key, the second key, and the fourth key may all be generated by the encryption device. That is to say, the data encryption method in the embodiments of this application may rely on only one key, at least, provided by the decryption device to realize the process of obfuscation, signature, encryption and re-signature, which reduces the development workload of the decryption device. The security of the protection of the encryption device, the data to be encrypted and the decryption device is improved. The second key and the fourth key may be the same key, the first key and the second key may be a pair of public and private keys, thus the encryption device may generate a pair of public and private keys to realize the first key, the second key, and fourth key in the above embodiments.

The embodiments of the present application may also provide an encrypted file which includes the target ciphertext and the second signature.

The target ciphertext is obtained by encrypting the first key, the data to be encrypted, and the first signature using the third key. The first signature is a signature of the obfuscation operation result data that is obtained according to the second key. The obfuscation operation result data is obtained by performing the obfuscation operation on the first key and the data to be encrypted.

The second signature is a signature of the target ciphertext that is obtained according to the fourth key.

The structure and generation form of the encrypted file may be seen in FIG. 3, FIG. 4, and FIG. 5 in the above embodiments. For specific content of the encrypted file, the target ciphertext, the second signature, etc., reference may be made to the relevant description in the above embodiments, which will not be repeated here.

In some examples, the first key is a public key.

In some examples, the third key is a public key or a symmetric key.

In some examples, the second key and the fourth key are private keys.

Further, the first key is a public key, and the second key and/or the fourth key are private keys corresponding to the first key.

In some examples, the second key is the same as the fourth key.

In some examples, the obfuscation factor in the above obfuscation operation includes the first key.

Figure 6:
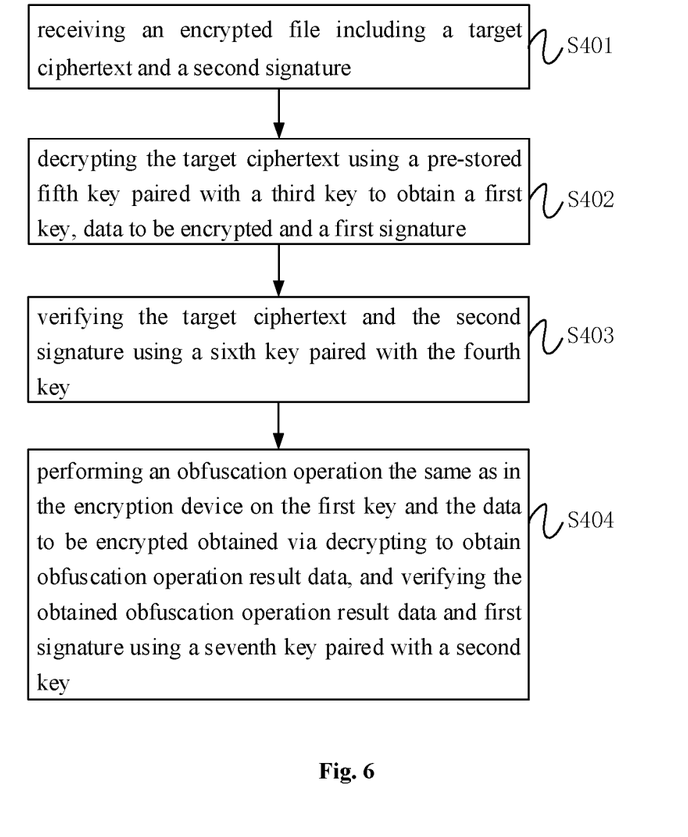
FIG. 6 is a flowchart of an embodiment of a data decryption method provided in the second aspect of the application.

FIG. 6 is a flowchart of an embodiment of a data decryption method provided in the second aspect of the application. The data decryption method may be applied to the decryption device. As shown in FIG. 6, the data decryption method may include steps S401 to S404.

In step S401, the encrypted file including the target ciphertext and the second signature is received.

In order to facilitate correspondence with the data encryption method in the above embodiments, the description involved in the data decryption method in the embodiments of the present application corresponds to that involved in the above data encryption method.

The second signature is the signature of the target ciphertext that is obtained by the encryption device according to the fourth key. The target ciphertext is obtained by encrypting the first key, the data to be encrypted, and the first signature by the encryption device using the third key. It should be noted that the encrypted file in the embodiments of the present application has already been transmitted, and during the transmission, the target ciphertext and the second signature may be tampered with.

In some examples, the encrypted file may also include other data, such as publicly available data.

In step S402, a pre-stored fifth key paired with the third key is used to decrypt the target ciphertext to obtain the first key, the data to be encrypted, and the first signature.

In some examples, the third key and the fifth key may be symmetric keys or a pair of public and private keys generated by the decryption device, and the decryption device sends the third key to the encryption device, so that the encryption device uses the third key to encrypt the first key, the data to be encrypted, and the first signature. The decryption device may decrypt the target ciphertext using the fifth key paired with the third key, and the decrypted target ciphertext includes the first key, the data to be encrypted, and the first signature.

In some examples, the first key is a public key. The third key may be a public key or a symmetric key. If the third key is a public key, the fifth key is a private key paired with the third key. If the third key is a symmetric key, the fifth key is the same as the third key.

In step S403, the target ciphertext and the second signature are verified using a sixth key paired with the fourth key.

The decryption device may verify the target ciphertext and the second signature. If the target ciphertext and the second signature are successfully verified, it means that the target ciphertext and the second signature have not been tampered with.

In some examples, the fourth key is a private key, and the sixth key is a public key paired with the fourth key. Further, in a case where the first key is a public key and the fourth key is a private key corresponding to the first key, the sixth key is the first key obtained after decryption of the target ciphertext. The decryption device may obtain the sixth key, that is, the first key, during decryption of the target ciphertext without storing the sixth key itself. On the one hand, it can prevent the sixth key from being leaked by the decryption device. On the other hand, it is convenient for the management of the sixth key, that is, the sixth key is updated with the target ciphertext, which further improves the security of encryption and decryption.

In step S404, the same obfuscation operation as in the encryption device is performed on the decrypted first key and data to be encrypted to obtain the obfuscation operation result data, and the obtained obfuscation operation result data and first signature are verified using the seventh key paired with the second key.

The first signature is a signature of the obfuscation operation result data that is obtained by the encryption device according to the second key. The decryption device may verify the obtained obfuscation operation result data and first signature. If the obtained obfuscation operation result data and first signature are successfully verified, it means that the data to be encrypted, the first key and the first signature have not been tampered with.

In some examples, the second key is a private key, and the seventh key is a public key paired with the second key. Further, in a case where the first key is a public key and the second key is a private key corresponding to the first key, the seventh key is the first key obtained after decryption of the target ciphertext. The decryption device may obtain the seventh key, that is, the first key during decryption of the target ciphertext without storing the seventh key itself. On the one hand, it can prevent the seventh key from being leaked by the decryption device. On the other hand, it is convenient for the management of the seventh key, that is, the seventh key is updated with the target ciphertext, which further improves the security of encryption and decryption.

In some examples, the obfuscation factor in the above obfuscation operation includes the first key.

In the embodiments of the present application, the encrypted file received by the decryption device includes the target ciphertext and the second signature, and the target ciphertext is decrypted using the fifth key paired with the third key to obtain the first key, the data to be encrypted, and the first signature. The target ciphertext and the second signature are verified using the sixth key paired with the fourth key. The same obfuscation operation as in the encryption device is performed on the decrypted first key and data to be encrypted to obtain the obfuscation operation result data. The obfuscation operation result data and the first signature are verified using the seventh key paired with the second key, to complete the whole process of decryption and verification. If the content in the encrypted file is tampered with, it can be detected that by verification. Thus, the security of data protection is improved.

Specifically, in the above embodiments, if the verification of the target ciphertext and the second signature is successful, and the verification of the obtained obfuscation operation result data and first signature is successful, it is determined that the encrypted file has not been tampered with.

In some examples, the third key may be generated by the decryption device. Correspondingly, the data decryption method in the above embodiments may further include the step of generating and sending the third key to the encryption device.

In some examples, the first key, the second key, and the fourth key in the above embodiments may be generated by the encryption device. That is to say, the process of obfuscation, signature, encryption and re-signature in the data encryption method implemented by the encryption device may rely on only one key, at least, which reduces the development workload of the decryption device. The security of the protection of the encryption device, the data to be encrypted and the decryption device is improved.

Figure 7:
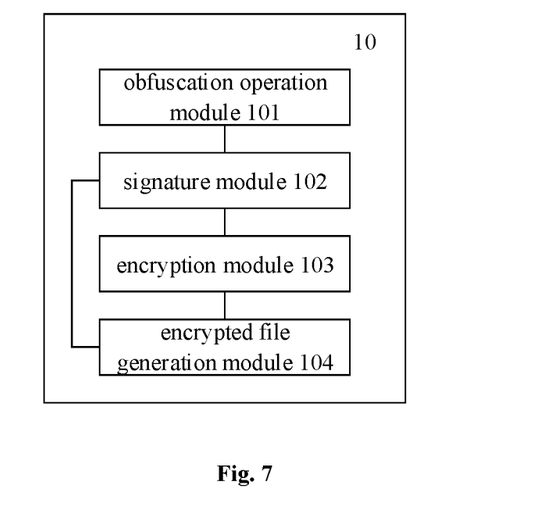
FIG. 7 is a schematic structural diagram of an embodiment of an encryption device provided in the third aspect of the application.

FIG. 7 is a schematic structural diagram of an embodiment of an encryption device provided in the third aspect of the application. As shown in FIG. 7, the encryption device 10 may include an obfuscation operation module 101, a signature module 102, an encryption module 103 and an encrypted file generation module 104.

The obfuscation operation module 101 may be used to obtain a first key, and perform an obfuscation operation on the first key and data to be encrypted, to obtain an obfuscation operation result.

The signature module 102 may be used to obtain a second key, and obtain a first signature of the obfuscation operation result according to the second key.

The encryption module 103 may be used to obtain a third key, and encrypting the first key, the data to be encrypted, and the first signature using the third key to obtain a target ciphertext.

The signature module 102 may also be used to obtain a fourth key, and obtain a second signature of the target ciphertext according to the fourth key.

The encrypted file generation module 104 may be used to generate an encrypted file including the target ciphertext and the second signature.

In the embodiments of the present application, the obfuscation operation is performed on the first key and the data to be encrypted, and the obfuscated first key and data to be encrypted are signed to obtain the first signature. The first key, the data to be encrypted, and the obtained first signature are encrypted using the third key, and the encrypted first key, data to be encrypted and first signature are signed to obtain the second signature, so as to obtain the encrypted file including the second signature, the encrypted first key, data to be encrypted and first signature. The data to be encrypted is processed by means of four protections: obfuscation, signature, encryption and re-signature. Thus, the security of data protection is improved.

Figure 8:
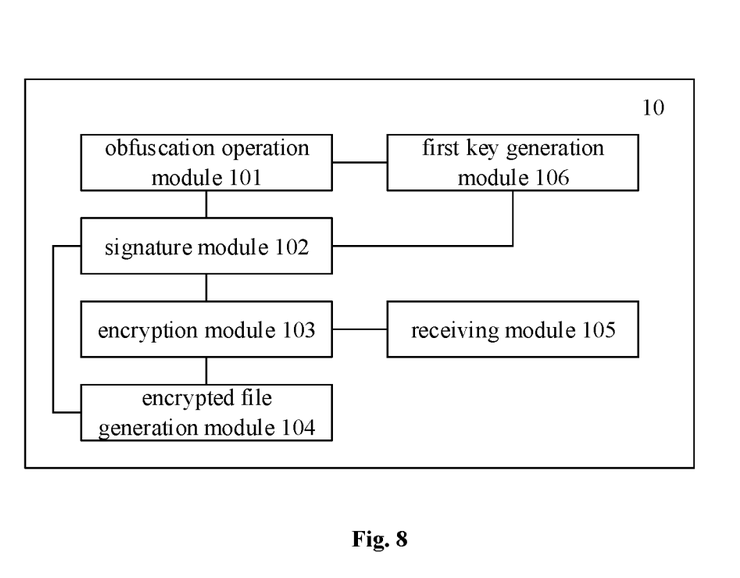
FIG. 8 is a schematic structural diagram of another embodiment of an encryption device provided in the third aspect of the application.

FIG. 8 is a schematic structural diagram of another embodiment of an encryption device provided in the third aspect of the application. The difference between FIG. 8 and FIG. 7 is that the encryption device 10 shown in FIG. 8 further includes a receiving module 105 and a first key generation module 106.

The receiving module 105 may be used to receive the third key generated and sent by the decryption device.

In some examples, the third key is a public key or a symmetric key.

The first key generation module 106 may be used to generate the first key, the second key, and the fourth key.

In some examples, the first key is a public key.

In some examples, the second key and the fourth key are private keys.

Further, the first key is a public key, and the second key and/or the fourth key are private keys corresponding to the first key.

In some examples, the second key is the same as the fourth key.

In some examples, the obfuscation factor in the above obfuscation operation includes the first key.

Figure 9:
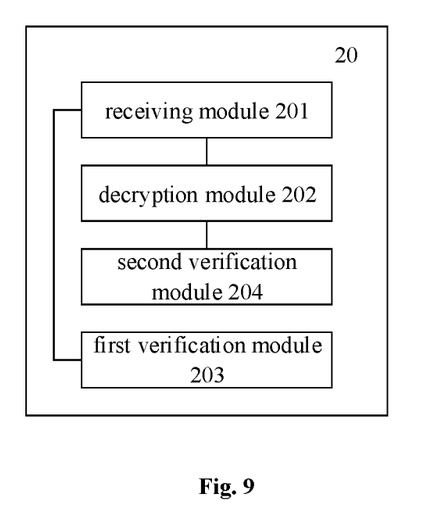
FIG. 9 is a schematic structural diagram of an embodiment of a decryption device provided in the fourth aspect of the application.

FIG. 9 is a schematic structural diagram of an embodiment of a decryption device provided in the fourth aspect of the application. As shown in FIG. 9, the decryption device 20 may include a receiving module 201, a decryption module 202, a first verification module 203, and a second verification module 204.

The receiving module 201 may be used to receive an encrypted file including a target ciphertext and a second signature. The second signature is a signature of the target ciphertext that is obtained by the encryption device according to a fourth key.

The decryption module 202 may be used to decrypt the target ciphertext using a pre-stored fifth key paired with a third key to obtain a first key, data to be encrypted, and a first signature.

The first verification module 203 may be used to verify the target ciphertext and the second signature using a sixth key paired with the fourth key.

The second verification module 204 may be used to perform the same obfuscation operation as in the encryption device on the decrypted first key and data to be encrypted to obtain obfuscation operation result data, and verify the obfuscation operation result data and the first signature using a seventh key paired with a second key.

The first signature is a signature of the obfuscation operation result data that is obtained by the encryption device according to the second key.

In the embodiments of the present application, the encrypted file received by the decryption device includes the target ciphertext and the second signature, and the target ciphertext is decrypted using the fifth key paired with the third key to obtain the first key, the data to be encrypted, and the first signature. The target ciphertext and the second signature are verified using the sixth key paired with the fourth key. The same obfuscation operation as in the encryption device is performed on the decrypted first key and data to be encrypted, and the obfuscated decrypted first key and data to be encrypted and the first signature are verified using the seventh key paired with the second key, to complete the whole process of decryption and verification. If the content in the encrypted file is tampered with, it can be detected by verification. Thus, the security of data protection is improved.

Figure 10:
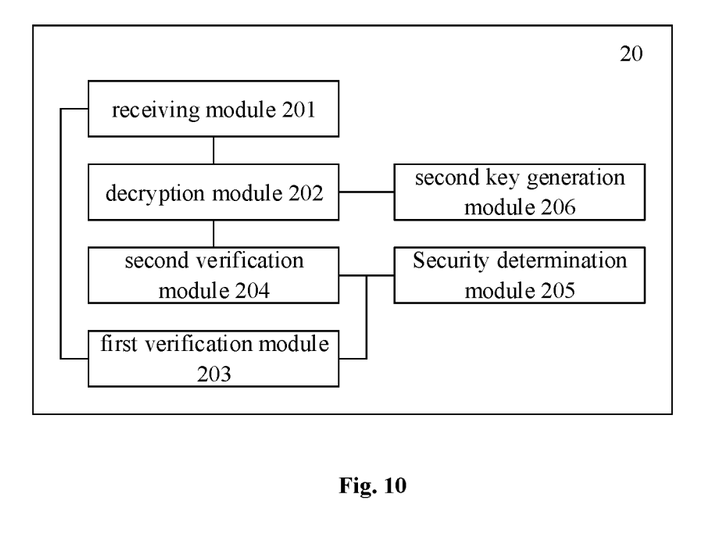
FIG. 10 is a schematic structural diagram of another embodiment of a decryption device provided in the fourth aspect of the application.

FIG. 10 is a schematic structural diagram of another embodiment of a decryption device provided in the fourth aspect of the application. The difference between FIG. 10 and FIG. 9 is that the decryption device 20 shown in FIG. 10 may further include a security determination module 205 and a second key generation module 206.

The security determination module 205 may be used to determine that the encrypted file has not been tampered with if the verification of the target ciphertext and the second signature is successful, and the verification of the obtained obfuscation operation result data and first signature is successful.

The second key generation module 206 may be used to generate and send the third key to the encryption device.

In some examples, the first key is generated by the encryption device. The first key is a public key.

In some examples, the third key is a public key or a symmetric key. If the third key is a public key, the fifth key is a private key corresponding to the third key. If the third key is a symmetric key, the third key is the same as the fifth key.

In some examples, the second key and the fourth key are generated by the encryption device. The second key and the fourth key are private keys.

Further, in a case where the first key is a public key and the fourth key is a private key corresponding to the first key, the sixth key is the first key obtained by decryption of the target ciphertext. In a case where the first key is a public key and the second key is a private key corresponding to the first key, the seventh key is the first key obtained by decryption of the target ciphertext.

In some examples, the obfuscation factor in the above obfuscation operation includes the first key.

Figure 11:
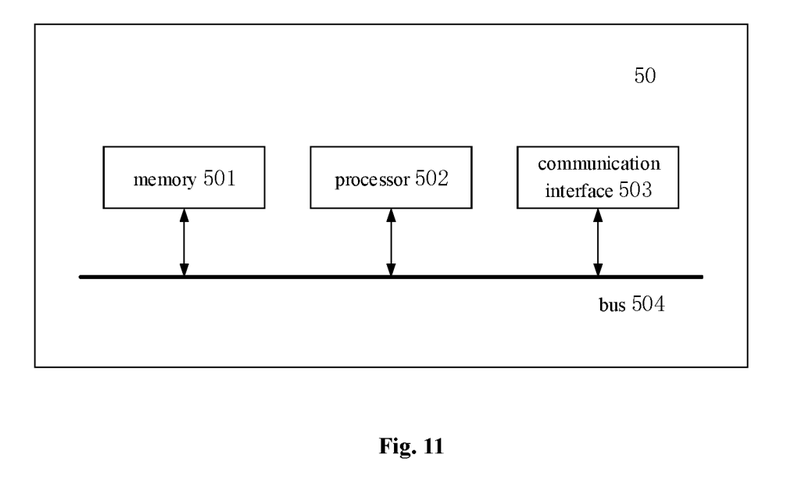
FIG. 11 is a schematic structural diagram of an embodiment of an encryption device provided in the fifth aspect of the application.

FIG. 11 is a schematic structural diagram of an embodiment of an encryption device provided in the fifth aspect of the application. As shown in FIG. 11, an encryption device 50 includes a memory 501, a processor 502, and a computer program stored on the memory 501 and executable on the processor 502.

In an example, the processor 502 may include a Central Processing Unit (CPU) or an Application Specific Integrated Circuit (ASIC), or may be configured as one or more integrated circuits implementing the embodiments of the present application.

The memory 501 may include a large-capacity memory for data or instructions. For example and not limitation, the memory 501 may include a Hard Disk Drive (HDD), a floppy disk drive, a flash memory, an optical disk, a magneto-optical disk, a magnetic tape or a Universal Serial Bus (USB) drive, or a combination of two or more of these. Where appropriate, the memory 501 may include removable or non-removable (or fixed) media. Where appropriate, the memory 501 may be opened inside or outside the encryption device 50 at a terminal hotspot. In a particular embodiment, the memory 501 is a non-volatile solid-state memory. In a specific embodiment, the memory 501 includes a Read-Only Memory (ROM). Where appropriate, the ROM may be a mask-programmed ROM, a Programmable Read-Only Memory ROM (PROM), an Erasable Programmable Read-Only Memory (EPROM), an Electrically Erasable Programmable Read-Only Memory (EEPROM), an Electrically Alterable Read-Only Memory (EAROM) or flash memory, or a combination of two or more of these.

The processor 502 runs the computer program corresponding to the executable program code by reading the executable program code stored in the memory 501, so as to implement any embodiment of the data encryption methods in the first aspect of the present application.

In an example, the encryption device 50 may further include a communication interface 503 and a bus 504. As shown in FIG. 11, the memory 501, the processor 502, and the communication interface 503 are connected and complete mutual communication through the bus 504.

The communication interface 503 is mainly used to implement communication between various modules, devices, units, and/or apparatus in the embodiments of the present application. An input device and/or an output device may also be accessed through the communication interface 503.

The bus 504 includes hardware, software, or both, and couples the components of the encryption device 50 to each other. For example and not limitation, the bus 504 may include an Accelerated Graphics Port (AGP) or other graphics bus, an Enhanced Industry Standard Architecture (EISA) bus, a Front Side Bus (FSB), a HyperTransport (HT) interconnection, an Industrial Standard Architecture (ISA) bus, an unlimited bandwidth interconnection, a Low pin count (LPC) bus, a memory bus, a Micro Channel Architecture (MCA) bus, a Peripheral Component Interconnect (PCI) bus, a PCI-Express (PCI-X) bus, a Serial Advanced Technology Attachment (SATA) bus, a Video Electronics Standards Association Local Bus (VLB) bus or other suitable bus or a combination of two or more of these. Where appropriate, the bus 504 may include one or more buses. Although the embodiments of this application describe and show a specific bus, any suitable bus or interconnection is considered in this application.

The embodiments of the present application may also provide a decryption device. For the specific structure of the decryption device, reference may be made to the encryption device 50 shown in FIG. 11. It should be noted that the processor in the decryption device runs the computer program corresponding to the executable program code by reading the executable program code stored in the memory, so as to realize any embodiment of the data decryption method in the second aspect of the present application. For the rest of the content, reference may be made to the relevant description in the above embodiments, which will not be repeated here.

The embodiments of the present application also provides a computer-readable storage medium storing a computer program which, when executed by a processor, may implement any embodiment of the above data encryption methods in the first aspect of the present application or any embodiment of the above data decryption methods in the second aspect of the present application. Examples of computer-readable media may be non-transitory computer-readable media, including ROM, RAM, magnetic disks, or optical disks, etc.

It should be clear that the various embodiments in this specification are described in a progressive manner, and the same or similar parts between the various embodiments can be referred to each other. The focus of each embodiment focuses is different from that of other embodiments. For the encrypted file embodiments, the device embodiments, and the computer-readable storage medium embodiments, reference may be made to description part of the method embodiments for relevant details. The application is not limited to the specific steps and structures described above and shown in the figures. Those skilled in the art may make various changes, modifications and additions, or change the order between steps after grasping the spirit of the application. And, for the sake of brevity, a detailed description of known methods and technologies is omitted here.

Above, various aspects of the present application are described with reference to the flowcharts and/or block diagrams of the methods, devices (systems) and computer program products according to the embodiments of the present application. It should be understood that each block in the flowcharts and/or block diagrams and combinations of blocks in the flowcharts and/or block diagrams may be implemented by computer program instructions. These computer program instructions may be provided to the processor of a general-purpose computer, a special-purpose computer, or other programmable data processing device to produce a machine that causes the execution of these instructions via the processor of the computer or other programmable data processing device to enable implementation of the functions/actions specified in one or more blocks of the flowcharts and/or block diagrams. Such a processor may be, but is not limited to, a general-purpose processor, a dedicated processor, a special application processor, or a field programmable logic circuit. It can also be understood that each block in the block diagrams and/or flowcharts and the combination of the blocks in the block diagrams and/or flowcharts may also be implemented by dedicated hardware that performs a specified function or action, or may be implemented by a combination of dedicated hardware and computer instructions.

Those skilled in the art should understand that the above embodiments are all exemplary rather than restrictive. Different technical features appearing in different embodiments may be combined to achieve beneficial effects. Those skilled in the art should be able to understand and implement other modified embodiments of the disclosed embodiments on the basis of studying the drawings, the description, and the claims. In the claims, the term "comprising" does not exclude other means or steps; the quantifier "a" does not exclude multiple; the terms "first" and "second" are used to denote names rather than to indicate any specific order. Any reference signs in the claims should not be construed as limiting the scope of protection. The functions of multiple parts appearing in the claims may be implemented by a single hardware or software module. Appearance of certain technical features in different dependent claims does not mean that these technical features cannot be combined to achieve beneficial effects.

What is claimed is:

1. A method for data encryption, comprising:
obtaining a first key, and performing an obfuscation operation on the first key and data to be encrypted to obtain obfuscation operation result data, wherein an obfuscation factor in the obfuscation operation includes the first key;

obtaining a second key, and obtaining a first signature of the obfuscation operation result data according to the second key;

obtaining a third key, and encrypting the first key, the data to be encrypted and the first signature using the third key to obtain a target ciphertext;

obtaining a fourth key, and obtaining a second signature of the target ciphertext according to the fourth key;

generating an encrypted file including the target ciphertext and the second signature, wherein the first key is a public key, and the fourth key is a private key corresponding to the first key.

2. The method according to claim 1, further comprising: receiving the third key generated and sent by a decryption device.

3. The method according to claim 1, wherein the first key is generated by an encryption device.

4. The method according to claim 1, wherein the third key is a public key or a symmetric key.

5. The method according to claim 1, wherein:
the second key and the fourth key are keys generated by an encryption device;
the second key is a private keys corresponding to the first key.

6. The method according to claim 1, wherein the second key is the same as the fourth key.

7. A method for data decryption, comprising:
receiving an encrypted file including a target ciphertext and a second signature, wherein the second signature is a signature of the target ciphertext and obtained by an encryption device according to a fourth key;
decrypting the target ciphertext using a pre-stored fifth key paired with a third key to obtain a first key, data to be encrypted and a first signature;
verifying the target ciphertext and the second signature using a sixth key paired with the fourth key;
performing an obfuscation operation the same as in the encryption device on the first key and the data to be encrypted obtained via decrypting to obtain obfuscation operation result data, and verifying the obtained obfuscation operation result data and first signature using a seventh key paired with a second key, wherein the first signature is a signature of the obfuscation operation result data and obtained by the encryption device according to the second key, wherein an obfuscation factor in the obfuscation operation includes the first key, wherein the first key is a public key, the fourth key is a private key corresponding to the first key.

8. The method according to claim 7, further comprising:
determining that the encrypted file is not tampered with, under a condition that the verification of the target ciphertext and the second signature is successful and the verification of the obtained obfuscation operation result data and first signature is successful.

9. The method according to claim 7, wherein before the receiving an encrypted file including a target ciphertext and a second signature, the method further comprises:
generating and sending the third key to the encryption device.

10. The method according to claim 7, wherein the first key is generated by the encryption device.

11. The method according to claim 7, wherein the third key is a public key or a symmetric key.

12. The method according to claim 7, wherein:
the second key and the fourth key are keys generated by the encryption device;
the second key is a private key corresponding to the first key.

13. The method according to claim 7, wherein:
the sixth key is the first key obtained by decrypting the target ciphertext;
in a case the second key is a private key corresponding to the first key, the seventh key is the first key obtained by decrypting the target ciphertext.

14. An encryption device, comprising a processor, a memory, and a computer program stored on the memory and executable on the processor, wherein the computer program, when executed by the processor, implements the method for data encryption of claim 1.

15. A decryption device, comprising a processor, a memory, and a computer program stored on the memory and executable on the processor, wherein the computer program, when executed by the processor, implements the method for data decryption of claim 7.

16. A non-transitory computer-readable storage medium storing a computer program thereon, wherein the computer program, when executed by a processor, implements the method for data encryption of claim 1.

17. A non-transitory computer-readable storage medium storing a computer program thereon, wherein the computer program, when executed by a processor, implements the method for data decryption of claim 7.

* * * * *